INVENTOR.
JORGEN I. HAASE

ATTORNEY

INVENTOR.
JORGEN I. HAASE

March 1, 1960

J. I. HAASE 2,926,721

TIRE BUILDING DRUM

Filed Oct. 2, 1956

INVENTOR.
JORGEN I. HAASE

BY

*R. L. Miller*
ATTORNEY

March 1, 1960

J. I. HAASE 2,926,721

TIRE BUILDING DRUM

Filed Oct. 2, 1956

INVENTOR.
JORGEN I. HAASE

BY

R. L. Miller
ATTORNEY

March 1, 1960 — J. I. HAASE — 2,926,721
TIRE BUILDING DRUM
Filed Oct. 2, 1956 — 6 Sheets-Sheet 6

INVENTOR.
JORGEN I. HAASE
BY
ATTORNEY

United States Patent Office 2,926,721
Patented Mar. 1, 1960

2,926,721

TIRE BUILDING DRUM

Jorgen I. Haase, St. Petersburg, Fla., assignor to The Goodyear Tire & Rubber Company, Akron, Ohio, a corporation of Ohio Application October 2, 1956, Serial No. 613,569

13 Claims. (Cl. 154—9)

The present invention relates to a tire building machine and particularly to the tire building drum structure.

One object of this invention is to provide a crown type tire building drum particularly adaptable for use in building truck tires.

Another object of the invention is to provide a crown type drum structure having a plurality of drum sections which are readily removable from the tire after the tire has been built, the drum itself being separably mounted on a core or main support carried by the shaft of the usual tire building machine.

Another object of this invention is to provide a tire building drum which is readily adjustable to build tires of different sizes all of which have substantially the same bead diameter, merely by slight adjustments of the mechanism controlling the width of the drum so as to make it unnecessary to provide a large stock of drum sections for tires of different sizes.

Another object of this invention is to provide a drum made up of a series of sections which are axially contractible and which may be radially removed from within the tire after it has been built. This is important, particularly in the manufacture of multiple bead tires.

In building tires, usually a different drum size must be used for each different tire size. It is the purpose of this invention to reduce the number of tire drums which would have to be carried in stock to build tires of different sizes. Primarily, this invention provides means whereby a series of tires may be built by utilizing the same building drum where the bead diameters of the tires are the same, but in which the cross-sectional areas of the finished tires vary. This can be accomplished by providing means for changing the overall length of the tire building drum and includes not only means for changing the length of the drum by fine adjustments but includes means for readily substituting a linkage in each drum segment to provide for major overall adjustment in lengths.

It is also a purpose of this invention to provide a quickly mountable series of drum segments which may be separately mounted on the core one after the other, in proper operative relation thereto without interlocking means arranged between the segments themselves, each section having its own locking and locating means for positioning it in operative relation to the core, whereby when all are assembled each is properly located and held on the core.

In building tires on a drum of this type the beads underlie the edges of the drum and, therefore, a mere radial collapse of the drum segments is not very successful, because the beads must be spread and this requires a considerable amount of force, especially if the tire has multiple beads, because in order to get the radial collapsing of the segment the beads must be forced axially outward away from each other. This invention, therefore, contemplates removing the entire drum building surface with the tire and then after the tire has been removed individually removing each segment and without having to lay the segment aside, immediately replacing the segment on the support in its proper position and regardless of the order in which the segments are removed since each segment has its own individual locating and locking means. Of course, before each segment is removed it is collapsed axially so that it will pass the beads of the tire freely, or at the most, only have to move them axially a small amount.

Figure 8:
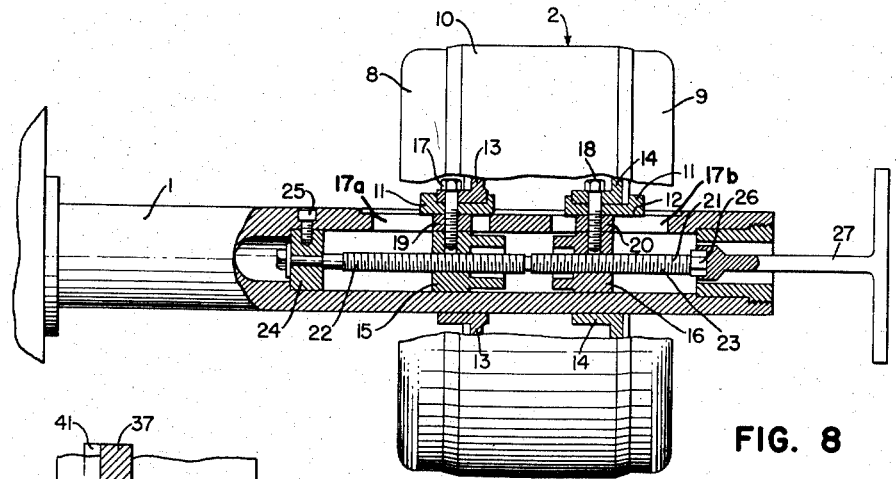
Fig. 8 is a front elevational view partly in section, of the tire building shaft and drum mounted thereon showing more or less schematically the method of adjusting the width of the drum for tires of different sizes.

Referring particularly to Fig. 8 of the drawings, there is shown a hollow shaft 1 on which the tire building drum 2 is mounted. This tire building drum comprises a series of peripherally arranged segments 3, 4, 5, 6 and 7 (see Fig. 1). Each of these drum segments comprises end sections 8 and 9 and a thin arcuately shaped plate section 10 bridging the two end sections and supported thereby. By moving the end segments axially toward and away from each other, the drum can be made shorter or longer for building tires of different cross-sectional areas and to permit removal of the segments from the completed tire as will be described later.

The shaft 1 is provided with the sleeve bearings 11 and 12 which are slidable along the shaft and these in turn carry the main supports 13 and 14 for the end sections 8 and 9 respectively. When the end sections 8 and 9 are in operative position they are locked to the supports 13 and 14 and move therewith. Interiorly of the hollow shaft 1 are cylindrical bearings 15 and 16 which slide longitudinally within the shaft and there are connected to the supports 13 and 14 and sleeve bearings 11 and 12 by bolts 17 and 18, or the like extending through the slots 17a and 18a in shaft 1. In order to prevent binding of the bearings 11 and 15 and 12 and 16 when they are drawn together by the bolts 17 and 18, spacers 19 and 20 are provided which are of sufficient thickness that the clamping pressure can be exerted to hold the parts rigidly together without causing them to bind on the shaft, whereby the drum segments 8 and 9 can be moved freely longitudinally of the shaft.

The bearings 15 and 16 are threaded internally to receive the shaft 21 which has oppositely threaded portions 22 and 23 so that upon rotation of the shaft 21 the bearings 15 and 16 and consequently the sections 8 and 9 will be moved axially toward and away from each other depending upon the direction of rotation of the shaft 21. The left end of the shaft as viewed in Fig. 8 is rotatably mounted but not axially movable in a bearing 24 fastened securely in position by a screw 25. This may be accomplished in any desired manner as long as provision is made for preventing the axial movement. The right end of the shaft is provided with a head 26 which is polygonal in shape so as to provide means whereby the shaft may be rotated by the use of a socket wrench 27 or similar means. It is preferable to use some type of removable tool such as the wrench 27, rather than a permanently fixed operating means for the shaft. This is primarily for the reason that it is desirable to keep the right hand end of the shaft free of obstructions, so as not to interfere with the mounting and dismounting of the drum or interfere with the building of the tire.

Figure 1:
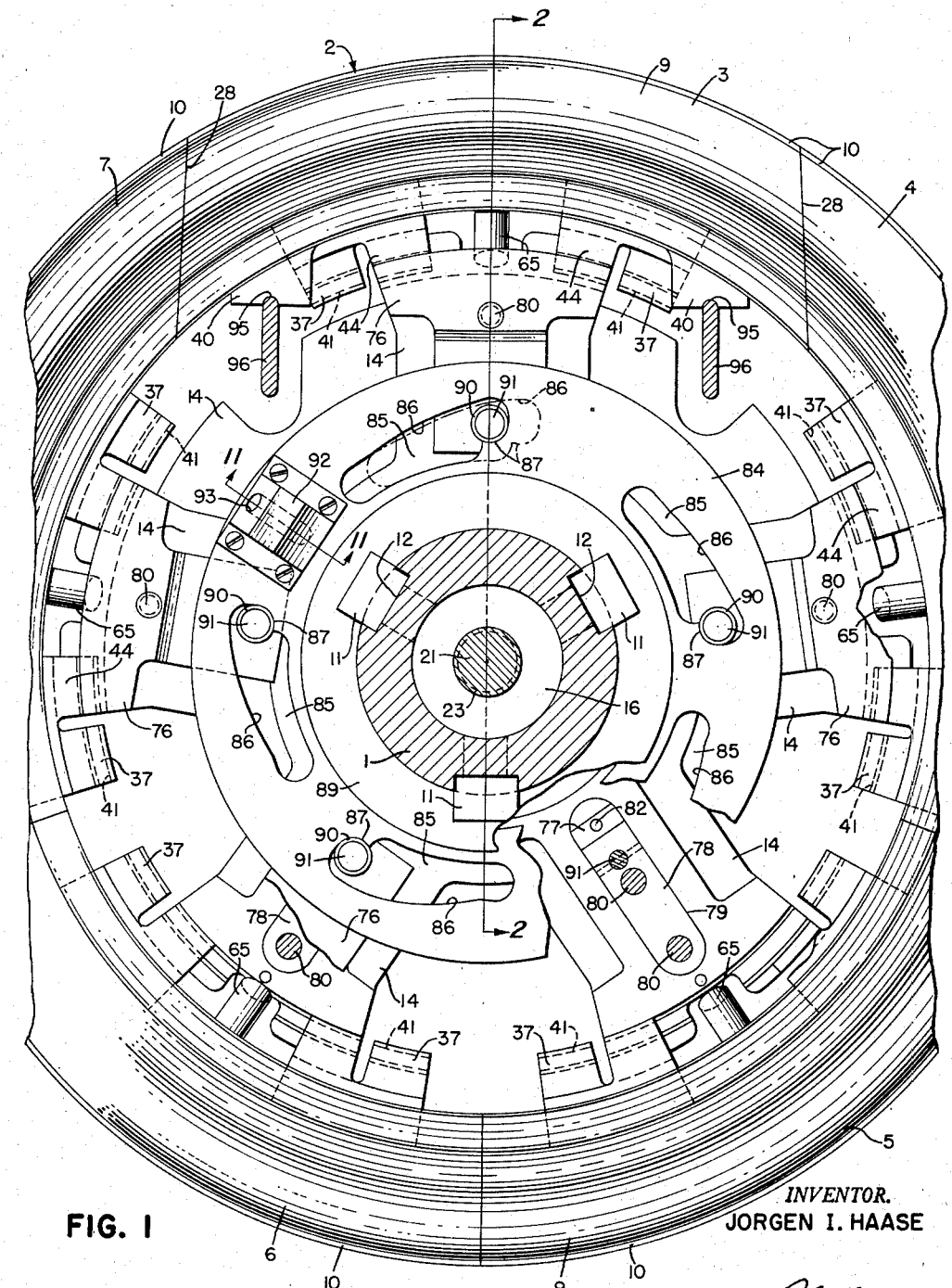
Fig. 1 is an elevational view of the outboard end of the drum structure with parts broken away for the sake of clearness.

In the mechanism just described it will be noted that the supports 12 and 13 can be readily adjusted axially of the shaft to receive drum segments which have been previously adjusted to a selected width as will be more apparent as the description of the invention proceeds. Means is provided for separably mounting the drum on the supports 13 and 14 so that after the tire is built the entire drum including the segments 3—7 inclusive may be removed from the supports along with the tire after which each segment can be collapsed axially to clear the beads of the tire as the segment is moved radially inward. For this purpose, one segment 3 has the peripherally arranged ends 28 substantially parallel to each other as illustrated in Fig. 1, but preferably these ends are slightly out of parallel so that the distance between said ends at the outer periphery of the segment is somewhat less than that at the inner edge, whereby this segment can be withdrawn from the tire without difficulty. The other segments 4, 5, 6 and 7 may be provided with radially extending ends as illustrated in Fig. 1 and removed in the same manner as segment 3.

Figure 4:
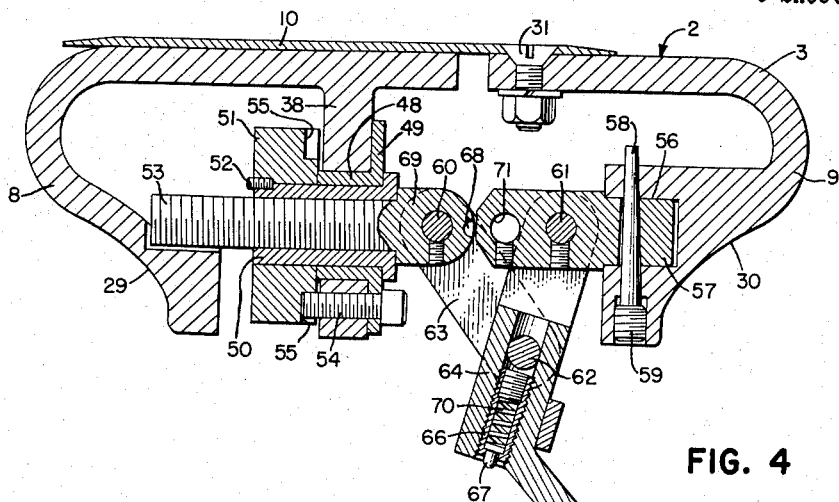
Fig. 4 is a cross-section of a drum segment similar to that shown in the upper part of Fig. 2, but with the parts in a different position of adjustment.
Figure 5:
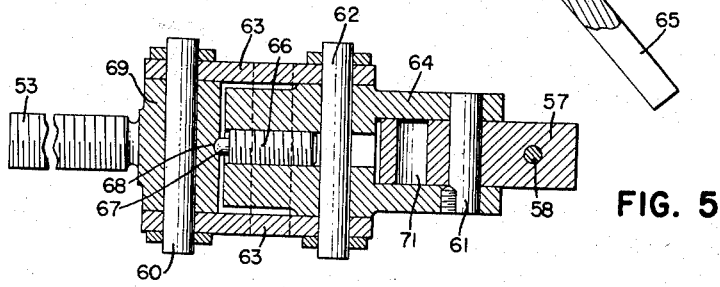
Fig. 5 is a cross-section substantially along the line 5—5 of Fig. 2.

Referring now particularly to Figs. 2, 4, 5 and 6 it will be noted that the end sections 8 and 9 of the segments are undercut at 29 and 30 to form what is referred to as a crown type drum and when building a tire on such a drum the beads are located in the undercut spaces 29 and 30, making it difficult to withdraw the segments from within the tire after it is built, without first axially moving the end sections 8 and 9 toward each other. Therefore, means must be provided for shortening the overall length of the segments in an axial direction before withdrawing the segments from the tire. Attention is called to the fact that as shown particularly in Fig. 4, the plate 10, which is of the same peripheral extent as the segment itself, is attached to one of the end sections such as 9 by means of a bolt 31 so as to move therewith. In Fig. 4, the segment is shown in collapsed position and in Figs. 2 and 6 in extended position.

In order to guide the end sections in their movement toward and from each other, the end section 8 is provided with bearing 32 having bores for receiving the guide pins 33 which are secured in the bearings 34 in section 9 by set screws 35. The guide pins 33 are notched as at 36 to receive the end of the set screws 35 to thus provide for the replacement of the pins 33 with other pins which are longer or shorter as the case may be, in order to provide for a greater or lesser maximum extension of the drum segments for different tire sizes.

Figure 2:
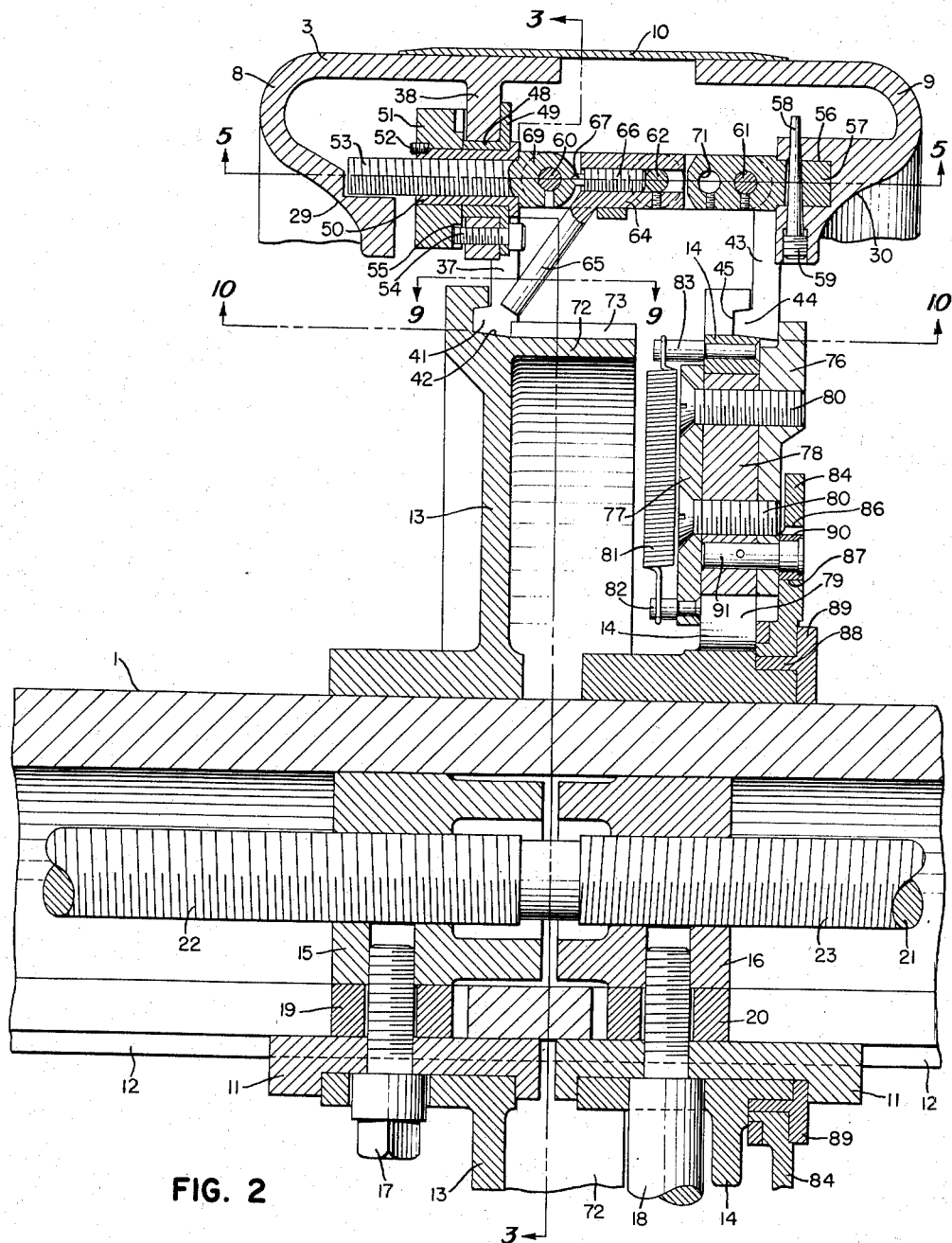
Fig. 2 is a section along the line 2—2 of Fig. 1.
Figure 3:
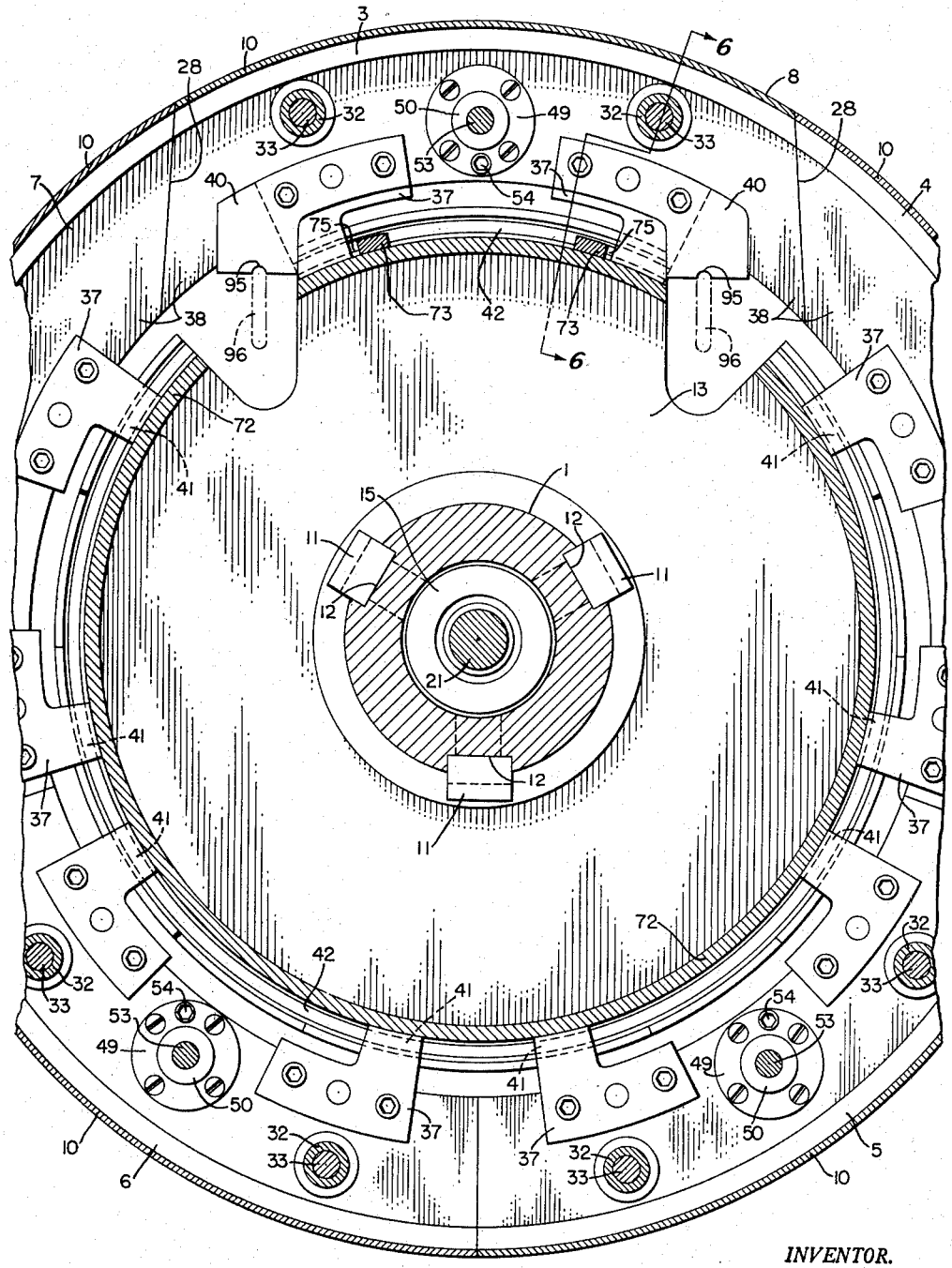
Fig. 3 is a section substantially along the line 3—3 of Fig. 2.
Figure 6:
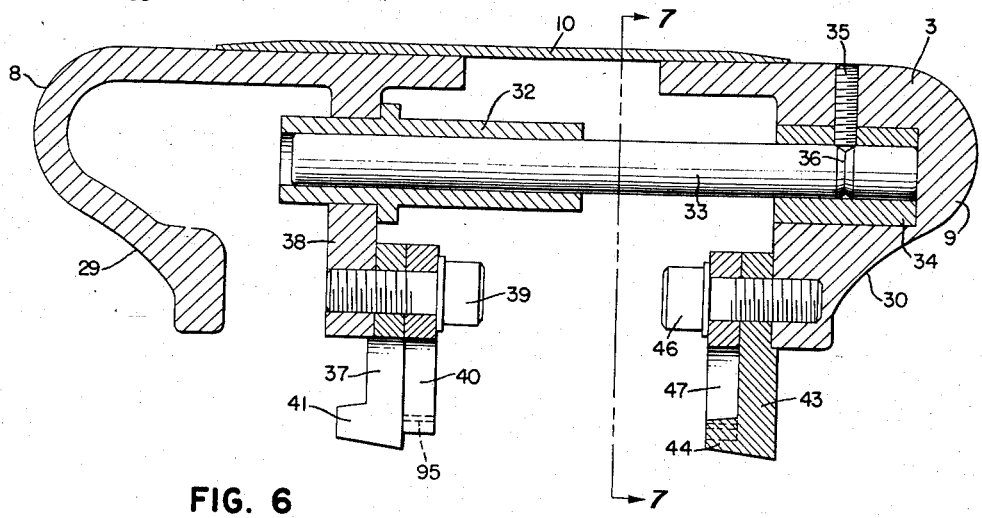
Fig. 6 is a section substantially along the line 6—6 of Fig. 3.
Figure 7:
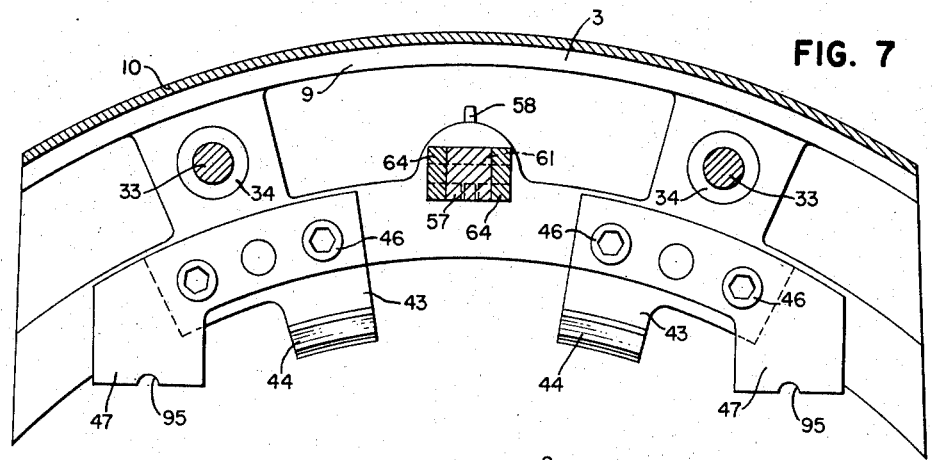
Fig. 7 is a section substantially along the line 7—7 of Fig. 6.

The end section 8 is provided with two peripherally spaced supporting brackets 37 bolted to the depending flange 38 by bolts 39, which bolts also hold drum carrying plates 40 for a purpose later to be described (see Fig. 3). Each bracket 37 has a tapered lug 41 at the lower end thereof. These tapered lugs fit within a corresponding recess 42 provided in the outer end of the support 13 as illustrated in Fig. 2. Similarly each end section 9 is provided with brackets 43 having tapered lugs 44 adapted to be mounted on the end of the support 14 in the recesses 45 (see Fig. 2). The bracket 43 as shown in Fig. 6 is held in place by a bolt 46 and a plate 47, similar to the plate 40, is also held in place by the same bolt. The plates 40 and 47 are provided preferably only on the one segment of the drum, that segment preferably being the segment 3.

By the above means it will be seen that means is provided on each of the end sections 8 and 9 for independently mounting and locating these sections on the supports 11 and 12 respectively. However, in order to do this successfully, the tapered lugs 41 and 45 should have the same spacing as the recesses in the supports 11 and 12 irrespective of the spacing of these supports 11 and 12. Means is provided for adjusting the length of the drum segments 8 and 9 axially to secure the desired drum width and thereafter the spacing of the supports is changed to agree with spacing of the lugs 41 and 45. It will be understood, of course, that such an adjustment of the supports and of the end sections is made when it is desired to change the overall width of the drum for building a different tire size. The pins 33 merely guide the sections to hold them in alignment during the movement of the sections toward and from each other, either during an adjustment or when the end sections are moved to collapse or expand the segment. The means for collapsing and adjusting the end sections with respect to each other is as follows:

It will be noted in Fig. 2 that the flange 38 has a bearing 48 provided with a radial thrust shoulder 49. This provides a bearing surface for a rotatable sleeve 50 to which an adjusting nut 51 is secured by a pin or screw 52 which causes the adjusting nut to move with the sleeve. The inner surface of the sleeve 50 is threaded to receive the threaded pin 53 whereby upon rotating the nut 51 the pin will be moved axially. A screw 54 threaded into the flange 38 can be moved into any of a series of peripherally arranged notches 55 to hold the nut in adjusted position. The essential feature of this part of the invention is that provision is made for locating the threaded pin 53 in any selected axial position with respect to the flange 37, and any means may be used for this purpose as long as the pin can be positively adjusted axially and then locked in the desired position.

The other end section 9 is provided with a recess 56 for receiving the end of a member 57, and this is solidly held in place by means of a tapered pin 58 having a threaded end 59 which positively locates and solidly holds the member 57 releasably in position. The opposed ends of the pin 53 and the member 57 are provided with pivots 60 and 61 between which is mounted a toggle link, the construction of which is more clearly understood by an inspection of Figs. 2, 4, 5 and 10. A pivot 62 extending through links 63 and 64 connects these links, which are in turn rotatably mounted at their opposite ends to the pivots 60 and 61 respectively. A handle member 65 is provided on the link 64 so that the links 63 and 64 can be moved from the position shown in Fig. 2 to that shown in Fig. 4, merely by pulling inwardly and axially on the handle. The end of the link 64 is provided with a threaded recess into which is threaded a detent holding sleeve 66 which has a spring pressed detent member 67 adapted to be received in a recess 68 in the head 69 on the end of the pin 51 when the toggle link is extended as in Fig. 2. Such a detent means is well known in the art and comprises a spring 70 for urging the pin 67 in a direction to the left as viewed in Fig. 5. It acts as means for holding the links 63 and 64 in operative position after they are moved into alignment. As used in the claims, the term "quickly releasable spacing means" refers to the toggle links 63 and 64 and associated parts needed for quickly moving the sections of each segment to and from each other and for positioning the sections in their desired spaced operative positions to give a predetermined length for each segment.

With the mechanism just described it is obvious that various adjustments can be made for securing the desired overall distance between the end sections 8 and 9. For example a fine adjustment can be made by adjusting the nut 51 as previously described in order to have a fine control over the overall length. In order to get a major adjustment of the overall length of a segment, I provide the link with another opening such as 71 for the pivot 61. This adjustment gives an increase to the overall length of the pin equal to the distance between the openings provided in the link 64. A further adjustment in overall length may be obtained by making spare units including links 63 and 64 of different lengths and such spare units can be bodily substituted for those shown to obtain a wide variety of overall lengths. A supply of such replaceable parts may be used to cut down on the number of drum segments that might otherwise have to be stocked.

Of course, the spacing of the supports 13 and 14 must be changed whenever the overall length of the drum segments is changed and this is accomplished by means of the socket wrench 27.

Figure 9:
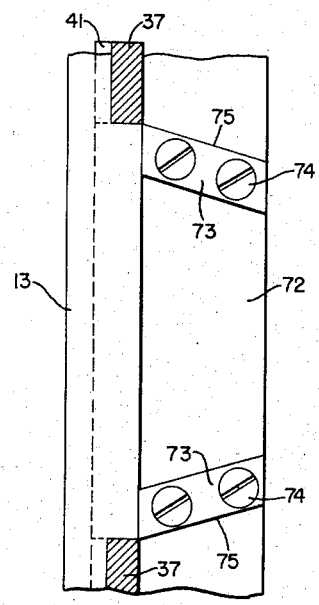
Fig. 9 is a section taken along the line 9—9 of Fig. 2.
Figure 10:
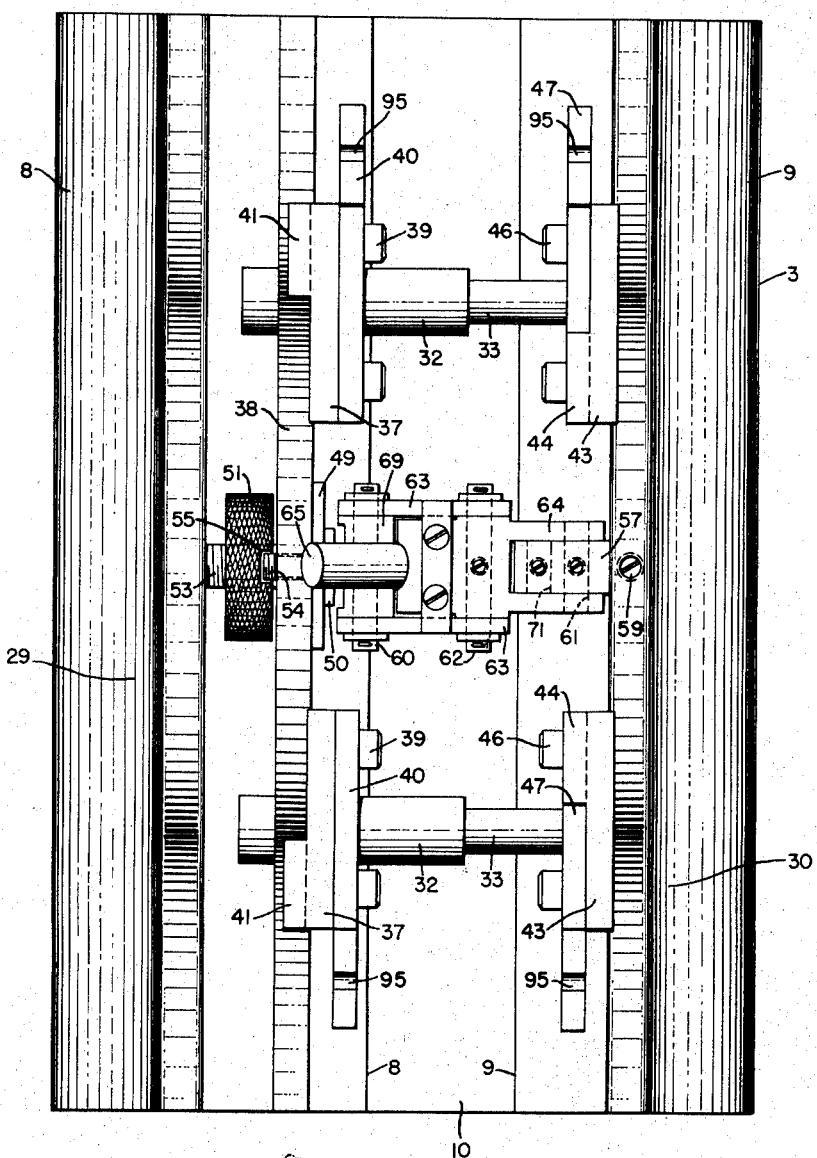
Fig. 10 is a bottom plan view of a drum segment looking in the direction 10—10 of Fig. 2.

In Figs. 2 and 9 it will be noted that the support 13 is provided with a drum-like flange 72 and on the outer surface drum are two guide members 73 fastened as by screws 74 to the drum. These guide members are arranged at an angle so that the outer surfaces 75 thereof act as guide surfaces to guide the lugs 41 into proper peripheral alignment with the recesses 42 in the support 13. There are pairs of guide members 73 for each drum segment so that each drum segment can be located independently of the others when mounting the segments on the supports. It will be noted in Fig. 1 that the lugs 44 are more closely spaced than lugs 41. This is to enable the lugs 41 to pass the supports 14 when the segments are being mounted or when the drum is removed from the supports. No guide members such as provided for lugs 41 are necessary for the lugs 45 on bracket 43, but means must be provided for latching the lugs 41 and 45 in operative position as each drum segment is mounted on the supports 13 and 14. Essentially this latching means comprises a plate 76 individual to each segment which moves into an upper latched position as shown in Fig. 2 against the outer surface of the bracket 43 carrying the lug 45. This plate 76 is radially slidable on the support 14 and can be guided in this direction by any desired means, but as shown the means for supporting and guiding this plate comprises a plate 77 on the opposite side of the support 14 and a spacing block 78 arranged between the plates 76 and 77 to hold the plates out of binding but close sliding contact with the opposite faces of the support 14. The spacing block operates in a radial slot 79 in the support 14 and the plates and spacing block are held together by means of screws 80.

The plate 76 is urged radially outward to the position shown in Fig. 2 by means of a spring 81 connected at one end to a pin 82 on the plate 77 and at the other to a pin 83 mounted rigidly at the outer end of the support 14. However, it can yield under pressure and move to its innermost position to permit the lugs 44 to slide thereover and enter the recesses 45 provided therefor in the support 14.

In mounting the drum segment on the supports 13 and 14 the operator merely rests the lugs 41 on the drum 72 with the two lugs 41 adjacent the guiding surfaces 75 and with the lugs 45 resting on the plate 76 to depress the plate. Then by an axial movement of the segment, the lugs 41 and 45 are moved into their respective recesses provided in the ends of the supports 13 and 14. As soon as this is accomplished the spring 81 urges the plate upwardly into the latching position shown in Fig. 2 to hold the drum segment in position.

Figure 11:
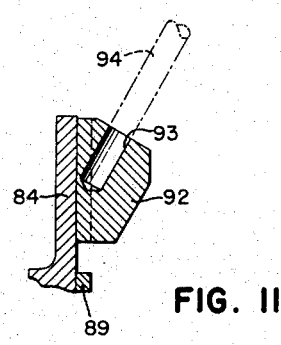
Fig. 11 is a cross-section taken substantially along the line 11—11 of Fig. 1.

To prevent accidental movement of the plate 76 out of operative position and to retract the plate when desired, there is provided, as best illustrated in Figs. 1 and 2, a cam operated locking plate 84 which has a series of cam slots 85 each having the shape illustrated in Fig. 1 and each including the arcuate cam surface 86 and the detent recess 87. This plate is mounted for rotation about the shaft 1 and as seen in Fig. 2 rotates on a bearing 88 which is provided with a retaining flange 89 to prevent axial movement of the locking plate 84. This retaining flange may be held in place by suitable screws or the like. A cam roller 90 mounted on the end of a pin 91 fixed to the spacing block 78 (see Fig. 2) is used to control the radial position of the plate 5. As will be noted from an inspection of Figs. 1 and 11, the locking plate 84 is provided with a bracket 92 having a recess 93 for receiving a removable handle 94 which is used to rotate the cam plate 84 in the desired peripheral direction. The handle 94 is preferably removably mounted merely for the sake of safety and convenience.

In Figs. 1 and 2 the latching plates 76 are in their outermost locking position and in this position they are held against radial inward movement because the rollers 90 rest in the detent recesses 87. When it is desired to remove the entire building drum and tire from the supports 13 and 14 it is only necessary to insert the handle 94 in the opening 93 and rotate the locking plate 84 in a clockwise direction as viewed in Fig. 1. This first releases all of the rollers 90 from the detent recesses 87 and then the cam surfaces 86 engage the rollers and cause a radial inward movement thereof. This moves the latching plates 76 to an inoperative position and permits axial withdrawal of the drum and tire from the supports 13 and 14 to a position where the drum segments can be removed from within the tire. After the drum has been removed from the supports the locking plate should be rotated in a counter-clockwise direction (Fig. 1), sufficient to move the cam slots 85 substantially to the positions shown by dotted lines in Fig. 1. This is not far enough to cause the rollers 90 to engage within detent recesses 87 and thus permits further inward movement of the plates 76 in mounting the segments and subsequently permits their outward movement under the influence of spring 81 to thereby lock the segments in place when the segments are properly positioned on the supports 13 and 14 with lugs 44 in recesses 45 and with lugs 41 in recesses 42. A further movement of the locking plate counter-clockwise will position the rollers 90 within the detent recesses to prevent radial inward movement of the plates 75. The locking plate may be held with sufficient friction to maintain its desired position or detent means may be employed to hold it in any of its positions.

In order to facilitate removal of the drum from the supports 13 and 14 I provide the plates 40 and 47 previously described. These plates, for convenience, have been eliminated from Fig. 2 but are shown in Figs. 1 and 6. These plates are provided with notches 95 at their lower edges to receive two axially extending bars 96 of a carrier mounted on an overhead track or other support. The bars can be moved into position underneath the plates 40 and 47 and then raised to take the weight of the drum and tire off the shaft to thus provide means for conveying the drum and tire away from the supports to a position where the drum segments can be removed. Other convenient means may be used for this purpose and the invention is not primarily concerned with such means.

In operation, each of the sections 4, 5, 6 and 7, all of which have identical quickly releasable spacing means are mounted in succession on the supports 13 and 14 in the manner described and finally the section 3 is applied although it is not particularly important that this section be applied last, because there is no tire encompassing the segments at this time. It, however, must be removed first when removing the drum segments from the tire. Of course, when mounting the drum segments, the locking plate 84 must be turned to move the slots to the dotted position shown in Fig. 1 to permit depression of the retaining plates 76. After the segments are all in position, the locking plate is rotated in a counter-clockwise direction to move the slots to the full line positions shown in Fig. 1 to thereby hold the plates in their outermost positions. It is then possible to build the tire in the usual manner and after the building operation, the cam plate 84 is again rotated in a clockwise direction as far as it will go to move the retaining plate 76 inwardly to permit the axial movement of the entire drum and tire. After removal, the drum and tire are laid on end on the floor and the operator reaches in and grasps the handle 65 on the quickly releasable spacing mechanism to move the end sections 8 and 9 toward each other, so that in removing the section 3 in an axially inward direction the end sections can pass the tire beads without substantial interference by the tire beads. After this has been done, each of the other segments 4, 5, 6 and 7 can be removed in a like manner.

As each segment is removed, it can be placed back on the supports 13 and 14, so that shortly after all of the segments have been removed from the tire they are again mounted on the supports, and, after movement of the locking plate 84 to the solid line position in Fig. 1, the drum is ready for the next tire building operation.

This eliminates the necessity of laying each segment aside on a support or on the floor and then later assembling them in reverse order into a complete drum for mounting on a drum shaft. This reduces the time interval necessary for building a tire and it also eliminates some substantial amount of fatigue to the operator, because these segments even though made of light metal are not very light in poundage for most truck tire sizes, and certainly when it comes to building the larger size cross sections, the segments become quite heavy and the less handling that is required the easier it will be on the operator.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. In a tire building machine, the combination with a drum supporting shaft, two axially spaced drum supports mounted on said shaft for axial adjustment with respect to each other whereby to vary the space therebetween, means for axially adjusting the spacing of said supports with respect to each other, a plurality of axially extending drum segments mounted releasably on said supports in side by side relation circumferentially of said shaft to form a tire building drum, said segments each comprising at least two axially spaced sections provided with guiding means for permissible axial sliding movement with respect to each other to vary the overall axial length thereof, locating means on each segment releasably engaging locating means on said supports for locating said segments in predetermined axial and circumferential positions on said supports when mounted thereon, collapsible linkage connecting said sections to each other for moving and holding said sections spaced from each other in predetermined tire-building relation and for moving said sections closer to each other when the linkage is collapsed to thus axially shorten said segments, said linkage including an adjustable connection between the linkage and one of said sections to determine the maximum distance by which the sections may be separated to correspond with the axial adjustment of the axially spaced supports on which it is mounted.

2. In a tire building machine the combination set forth in claim 1 in which latching means, individual to each segment, is provided for automatically releasably latching each segment in operative position on said supports when each such segment is moved into operative position on said support.

3. In a tire building machine the combination set forth in claim 1 in which latching means, individual to each segment, is provided for automatically releasably latching each segment in position on said supports when each such segment is moved into operative position on said support and in which means is provided for simultaneously moving all of said latching means to inoperative positions, whereby all of said segments may be removed from said supports simultaneously as a unit.

4. In a tire building machine the combination set forth in claim 2 in which locking means is provided for releasably holding all of said latching means in latching positions against movement to inoperative positions to thereby prevent accidental movement of said segments out of operative position on said supports until said locking means is released.

5. In a tire building machine, the combination set forth in claim 4 which includes releasing means on said locking means for releasing all of said latching means simultaneously to permit withdrawal of said segments as a unit from said supports after said locking means is moved to inoperative positions.

6. In a tire building machine, the combination with a shaft, a support on said shaft, a plurality of axially extending separably mountable drum segments arranged in side by side relation circumferentially of said support to form a tire building drum and having means thereon, individual to each segment, interlocking with cooperating means on said support for locating each segment individually on said support in operative position axially of said shaft, latching means individual to each segment mounted on said support and having means for automatically moving said latching means into operative position for holding each segment in operative position when said segment is in operative position on said support on said shaft, and movably mounted locking means for locking all of said latching means in operative position simultaneously comprising a follower on each latching means and a member having locking surfaces individual to each follower which move into locking positions adjacent said followers to hold said latching means against release when said locking means is moved to operative locking position.

7. In a tire building machine, the combination set forth in claim 6 in which the locking means has cam surfaces individual to each follower for engaging means on the followers to move all said latching means into inoperative positions individually simultaneously when said locking surfaces are moved into inoperative positions.

8. In a tire building machine, the combination set forth in claim 6 in which each latching means is mounted for radial movement on said support and in which each said latching means is provided with actuating means for normally resiliently urging said latching means radially outward into operative position, and in which said locking means comprises means for releasably holding said latching means against inward radial movement when said locking means is moved to operative position.

9. In a tire building machine, the combination set forth in claim 6 in which each latching means is mounted for radial movement on said support and in which each said latching means is provided with actuating means for normally resiliently urging said latching means radially outward into operative position and in which means is provided for moving all of said latching means radially inward substantially simultaneously to inoperative positions against the action of said resiliently actuating means.

10. In a tire building machine, the combination with a shaft, a drum support on said shaft, a plurality of similar axially extending drum segments arranged in side by side relation circumferentially of said support to form the entire drum surface and having means individual to each segment interlocking with means on said support for locating each segment on said support in operative position thereon axially and peripherally of said shaft, latching means on said support individual to each segment mounted and provided with means for automatically biasing said latching means into operative position when each said support is moved into operative position for holding each segment independently in operative position when so mounted thereon, each of said latching means having a follower thereon extending axially of said shaft and a cam plate rotatably mounted co-axially with respect to said shaft and having cam means thereon engaging said followers for moving said followers and consequently said latching means radially inward to inoperative positions when said cam plate is rotated to release all said latching means to thus permit removal of said segments from said supports as a unit.

11. A tire building machine comprising a shaft, a drum support on said shaft, drum segments extending axially of said shaft and arranged in side by side relation circumferentially of said shaft, and means for locating each of said segments in operative position on said shaft comprising radially inwardly extending brackets at each end of said segment having wedge shaped lugs projecting axially of said shaft, cooperating recesses in said support for receiving said lugs upon axial movement of said lugs toward said recesses and guiding means on said support adjacent said recesses for guiding said lugs into said recesses to align said brackets and consequently said segments in the desired circumferential positions when the inner ends of said brackets are arranged on said support and moved axially into said recesses.

12. A tire building machine as set forth in claim 11 in which latching means is provided on said support for preventing retrograde movement of said lugs out of said recesses after they are in operative positions.

13. A tire building machine as set forth in claim 12 in which means is provided for holding all of said latching means in locked position after mounting of said segments on said support and for moving all of said latching means into inoperative position simultaneously when it is desired to remove said drum as a segment from said support.

References Cited in the file of this patent

UNITED STATES PATENTS

| 2,335,169 | Bostwick | Nov. 23, 1943 |
| 2,353,767 | Schnedarek | July 18, 1944 |
| 2,413,445 | Freeman et al. | Dec. 31, 1946 |

FOREIGN PATENTS

| 716,364 | Great Britain | Oct. 6, 1954 |